United States Patent
Lindström et al.

(10) Patent No.: US 10,400,862 B2
(45) Date of Patent: Sep. 3, 2019

(54) GEARBOX FOR A HYBRID POWERTRAIN AND METHOD TO CONTROL SUCH A GEARBOX

(71) Applicant: SCANIA CV AB, Södertälje (SE)

(72) Inventors: Johan Lindström, Nyköping (SE); Mathias Björkman, Tullinge (SE); Niklas Pettersson, Stockholm (SE); Mikael Bergquist, Huddinge (SE)

(73) Assignee: SCANIA CV AB (SE)

( * ) Notice: Subject to any disclaimer, the term of this patent is extended or adjusted under 35 U.S.C. 154(b) by 53 days.

(21) Appl. No.: 14/780,452

(22) PCT Filed: Mar. 20, 2014

(86) PCT No.: PCT/SE2014/050336
§ 371 (c)(1),
(2) Date: Sep. 25, 2015

(87) PCT Pub. No.: WO2014/158075
PCT Pub. Date: Oct. 2, 2014

(65) Prior Publication Data
US 2016/0053864 A1    Feb. 25, 2016

(30) Foreign Application Priority Data

Mar. 27, 2013  (SE) .................................. 1350393

(51) Int. Cl.
*F16H 3/66*    (2006.01)
*B60K 1/02*    (2006.01)
(Continued)

(52) U.S. Cl.
CPC ................ *F16H 3/66* (2013.01); *B60K 1/02* (2013.01); *B60K 6/365* (2013.01); *B60K 6/387* (2013.01);
(Continued)

(58) Field of Classification Search
CPC ... B60K 1/02; B60K 6/365; F16H 2200/2007; F16H 3/006; F16H 2003/0803
See application file for complete search history.

(56) References Cited

U.S. PATENT DOCUMENTS

| | | | |
|---|---|---|---|
| 7,479,081 B2 | 1/2009 | Holmes | ............................. 475/5 |
| 7,931,102 B2 | 4/2011 | Katsuta et al. | .......... 180/65.225 |

(Continued)

FOREIGN PATENT DOCUMENTS

| | | |
|---|---|---|
| DE | 10 2006 025 525 A1 | 12/2007 |
| DE | 102008043732 A1 | 6/2009 |

(Continued)

OTHER PUBLICATIONS

International Search Report dated Jul. 4, 2014 issued in corresponding International patent application No. PCT/SE2014/050336.

(Continued)

*Primary Examiner* — Stacey A Fluhart
(74) *Attorney, Agent, or Firm* — Ostrolenk Faber LLP

(57) ABSTRACT

A gearbox having an input shaft (8) and an output shaft (20); a first epicyclic gear (10) connected to the input shaft (8); a second epicyclic gear (12) connected to the first epicyclic gear (10); a first electrical machine (14) connected to the first epicyclic gear (10); a second electrical machine (16) connected to the second epicyclic gear (12); a first main shaft (34) connected to the first epicyclic gear (10); a second main shaft (36) connected to the second epicyclic gear (12). A first coupling unit (56) disengagingly connects two rotatable components (22, 26, 50) at the first epicyclic gear (10), and a second coupling unit (58) disengagingly connects two rotatable components (28, 32, 51) at the second epicyclic gear (12), such that at least one of the rate of revolution and the torque at the first and the second main shafts (34, 36) can be influenced by controlling at least one of the first and the second coupling units (56, 58) to a condition of the rotatable (Continued)

components (22, 26, 50; 28, 32, 51) that is engaged or disengaged. Also a vehicle (1) having such a gearbox (2), a method to control such a gearbox (2), a computer program (P) to control a gearbox, and a computer program product comprising program code for an electronic control unit (48) or another computer (53) in order to implement the method.

14 Claims, 6 Drawing Sheets

(51) Int. Cl.
| | | |
|---|---|---|
| *B60K 6/365* | (2007.10) | |
| *B60K 6/445* | (2007.10) | |
| *B60K 6/547* | (2007.10) | |
| *F16H 3/00* | (2006.01) | |
| *B60K 6/387* | (2007.10) | |
| *F16H 61/04* | (2006.01) | |
| *F16H 37/10* | (2006.01) | |
| *B60K 6/38* | (2007.10) | |

(52) U.S. Cl.
CPC ............ *B60K 6/445* (2013.01); *B60K 6/547* (2013.01); *F16H 3/006* (2013.01); *F16H 61/0403* (2013.01); *B60K 2006/381* (2013.01); *B60Y 2400/421* (2013.01); *F16H 2037/101* (2013.01); *F16H 2200/2007* (2013.01); *F16H 2200/2064* (2013.01); *F16H 2200/2094* (2013.01); *Y02T 10/6239* (2013.01); *Y10S 903/91* (2013.01); *Y10S 903/945* (2013.01)

(56) References Cited

U.S. PATENT DOCUMENTS

| | | | |
|---|---|---|---|
| 8,047,314 B2 | 11/2011 | Oba et al. ............... 180/65.265 |
| 8,100,207 B2 | 1/2012 | Oba et al. ............... 180/65.285 |
| 8,231,491 B2 | 7/2012 | Oba et al. ..................... 475/5 |
| 8,251,165 B2 | 8/2012 | Katsuta et al. .......... 180/65.265 |
| 2002/0045507 A1 | 4/2002 | Bowen ............................ 475/5 |
| 2003/0100395 A1 | 5/2003 | Hiraiwa ........................... 475/5 |
| 2005/0227803 A1 | 10/2005 | Holmes |
| 2006/0111213 A1* | 5/2006 | Bucknor ............... B60K 6/445 475/5 |
| 2007/0099738 A1 | 5/2007 | Holmes ............................ 475/5 |
| 2007/0287565 A1* | 12/2007 | Cho ..................... B60W 20/40 475/5 |
| 2008/0064550 A1 | 3/2008 | Holmes ............................ 475/5 |
| 2008/0103002 A1 | 5/2008 | Holmes |
| 2009/0275437 A1* | 11/2009 | Kersting ................ B60K 6/26 475/5 |
| 2009/0320629 A1 | 12/2009 | Akashi et al. .................. 74/329 |
| 2010/0029436 A1 | 2/2010 | Katsuta et al. .................. 477/5 |
| 2010/0044128 A1 | 2/2010 | Oba et al. ................. 180/65.25 |
| 2010/0048338 A1* | 2/2010 | Si ......................... B60W 20/15 475/5 |
| 2010/0081533 A1* | 4/2010 | Lee ....................... B60W 20/15 475/5 |
| 2010/0137091 A1* | 6/2010 | Park ...................... B60K 6/365 475/5 |
| 2013/0109530 A1* | 5/2013 | Kaltenbach ........... B60K 6/387 477/5 |
| 2013/0324241 A1* | 12/2013 | Elliott ................... A63H 30/00 463/31 |
| 2015/0375736 A1 | 12/2015 | Kaltenbach et al. |
| 2016/0047441 A1 | 2/2016 | Björkman et al. |
| 2016/0053864 A1 | 2/2016 | Lindström et al. |
| 2016/0059686 A1 | 3/2016 | Björkman et al. |
| 2016/0061297 A1 | 3/2016 | Lindström et al. |
| 2016/0091063 A1 | 3/2016 | Rekow et al. |

FOREIGN PATENT DOCUMENTS

| | | |
|---|---|---|
| EP | 1 126 987 B1 | 8/2005 |
| EP | 1 280 677 B1 | 8/2005 |
| WO | WO 2007/110721 A1 | 10/2007 |
| WO | WO 2008/046185 A1 | 4/2008 |
| WO | WO 2008/081893 A1 | 7/2008 |
| WO | WO 2012/073651 A1 | 6/2012 |
| WO | WO 2014/046580 A1 | 3/2014 |

OTHER PUBLICATIONS

International Preliminary Report on Patentability dated Jun. 22, 2015 issued in corresponding International patent application No. PCT/SE2014/050336.

\* cited by examiner

GEARBOX FOR A HYBRID POWERTRAIN AND METHOD TO CONTROL SUCH A GEARBOX

CROSS-REFERENCE TO RELATED APPLICATIONS

The present application is a 35 U.S.C. §§ 371 national phase conversion of PCT/SE2014/050336, filed Mar. 20, 2014, which claims priority of Swedish Patent Application No. 1350393-3, filed Mar. 27, 2013 the contents of which are incorporated by reference herein. The PCT International Application was published in the English language.

BACKGROUND AND PRIOR ART

The present invention concerns a gearbox a vehicle that comprises such a gearbox, a method to control such a gearbox, a computer program to control such a gearbox, and a computer program product comprising program code for obtaining such control.

Hybrid vehicles can be driven by a primary engine, which may be a combustion engine, and a secondary engine, which may be an electrical machine. The electrical machine is equipped with at least one energy store, such as an electrochemical energy store, for the storage of electrical energy, and with regulating equipment in order to regulate the flow of electrical energy between the energy store and the electrical machine. The electrical machine can in this way alternate between working as an engine and as a generator, depending on the operating condition of the vehicle. When the vehicle is braked, the electrical machine generates electrical energy, which is stored in the energy store. This is generally known as "regenerative braking", and it leads to the vehicle being braked with the aid of the electrical machine and the combustion engine. The electrical energy that is stored is later used for the operation of the vehicle.

An epicyclic gear also known as a planetary gear normally comprises three components that are arranged in a manner that allows rotation of each component relative to each other. These components are a sun gear, a planet wheel carrier and a ring gear. Knowledge of the numbers of teeth on the sun gear and ring gear allows the mutual rates of revolution of the three components to be determined during operation. One of the components of the epicyclic gear may be connected to an output shaft of a combustion engine. Thus this component of the epicyclic gear rotates with a rate of revolution that corresponds to the rate of revolution of the output shaft of the combustion engine. A second component of the epicyclic gear may be connected to an input shaft to a gearbox. Thus this component of the epicyclic gear rotates with the same rate of revolution as the input shaft to the gearbox. A third component of the epicyclic gear is connected to a rotor of an electrical machine, in order to achieve hybrid operation. Thus this component of the epicyclic gear rotates with the same rate of revolution as the rotor of the electrical machine, if they are directly connected to each other. Alternatively, the electrical machine may be connected to the third component of the epicyclic gear through a transmission that has a gear exchange. In this case, the electrical machine and the third component of the epicyclic gear may rotate with different rates of revolution. At least one of the rate of revolution and the torque developed by electrical machines may be regulated in stepless increments. During operation, when the input shaft to the gearbox is to be given at least one of a desired rate of revolution and torque, a control unit calculates, given knowledge of the rate of revolution of the combustion engine, the rate of revolution with which the third component must be driven in order for the input shaft to the gearbox to be given the desired rate of revolution. A control unit activates the electrical machine such that it gives the calculated rate of revolution to the third component, and thus gives the desired rate of revolution to the input shaft to the gearbox.

By connecting together the output shaft of the combustion engine, the rotor of the electrical machine and the input shaft to the gearbox using an epicyclic gear, the conventional clutch mechanism can be avoided. During acceleration of the vehicle, increased torque is to be supplied from the combustion engine and the electrical machine to the gearbox and onwards to the driving wheels of the vehicle. Since both the combustion engine and the electrical machine are connected to the epicyclic gear, the greatest possible torque that can be supplied by the combustion engine and electrical machine will be limited by any one of these drive units, the greatest torque of which is lower than the greatest torque of the second drive unit, having taken the gear exchange between them into consideration. In the case in which the greatest torque of the electrical machine is lower than the greatest torque of the combustion engine, having taken the gear exchange between them into account, the electrical machine will not be able to produce a sufficiently large reactive torque to the epicyclic gear, and this leads to the combustion engine not being able to transfer its highest torque to the gearbox and onwards to the driving wheels of the vehicle. The highest torque that can be transferred to the gearbox is in this way limited by the power of the electrical machine. This is made clear also by the equation known as the "planetary equation".

There are disadvantages associated with using a conventional clutch that disconnects the input shaft to the gearbox from the combustion engine while gear-change processes are taking place in the gearbox, such as the heating of the lamellae of the clutch, which results in wear to the clutch lamellae and to increased fuel consumption. Furthermore, a conventional clutch mechanism is relatively heavy and expensive. Also, it occupies a relatively large space in the vehicle.

The document EP-B1-1126987 reveals a gearbox with double epicyclic gears. The sun gear of each epicyclic gear is connected to an electrical machine, and the ring gears of the epicyclic gears are connected to each other. The planet gear carriers of each epicyclic gear are connected to a number of gear pairs, in such a manner that an infinite number of gear steps is obtained. Another document, EP-B1-1280677, reveals also how the epicyclic gears can be bridged by a gear step arranged at the output shaft of the combustion engine.

The document US-A1-20050227803 reveals a vehicle transmission with two electrical machines, each one is connected to a sun gear in one of two epicyclic gears. The epicyclic gears have a common planet gear carrier, which is connected to the input shaft of the transmission.

The document WO2008/046185-A1 reveals a hybrid transmission with two epicyclic gears, whereby an electrical machine is connected to one of the epicyclic gears and a double clutch interacts with the second epicyclic gear. The two epicyclic gears interact also with each other through a cogged wheel transmission.

SUMMARY OF THE INVENTION

Despite known solutions in the technical area being available, there is a need to develop further a gearbox that changes gears without interruption in torque, that demonstrates a regenerative brake arrangement, that has a compact design, that has a high reliability and high dependability, that demonstrates low weight, and that under certain operating conditions is self-sufficient with respect to the supply of electricity.

The space available for the drive arrangement in a vehicle is often limited. If the drive arrangement comprises several components, such as a combustion engine, an electrical machine, a gearbox and an epicyclic gear, the design must be compact. If further components, such as a regenerative brake arrangement, are to be included, even stricter demands are placed that the components that are parts of the drive arrangement have a compact design. At the same time, the components that are parts of the drive arrangement must be designed with dimensions that can absorb the necessary forces and torques.

A large number of gear steps are required in certain types of vehicle, in particular in lorries and buses. In this case, the number of components that are parts of the gearbox increases, and the gearbox also must be dimensioned such that it can absorb large forces and torques, that arise in such heavy vehicles. This results in the size and weight of the gearbox increasing.

High demands are placed also on high reliability and high dependability, for the components that are parts of the drive arrangement. Wear arises in cases in which the gearbox contains lamellar clutches, which wear influences the reliability and lifetime of the gearbox.

Kinetic energy is converted into electrical energy during regenerative braking, which electrical energy is stored in an energy store, such as accumulators. One factor that influences the lifetime of the energy store is the number of cycles that the energy store supplies current to the electrical machines and receives current from them. The greater the number of cycles, the shorter will be the lifetime of the energy store.

The purpose of the present invention is to provide a gearbox that changes gear without interruption in torque.

A further purpose of the invention is to provide a gearbox with a regenerative brake arrangement.

A further purpose of the present invention is to provide a gearbox that has a compact design.

A further purpose of the present invention is to provide a gearbox that has high reliability and high dependability.

A further purpose of the invention is to provide a gearbox for a vehicle, which gearbox demonstrates low weight.

A further purpose of the invention is to provide a gearbox for a vehicle, which gearbox can be connected directly to an output shaft at the gearbox.

A further purpose of the invention is to provide a gearbox that is self-sufficient with respect to electricity under certain operating conditions.

A further purpose of the invention is to provide a gearbox with a regenerative brake arrangement that increases the lifetime of an energy store connected to the regenerative brake arrangement.

A further purpose of the invention is to provide a new and advantageous computer program for the control of the gearbox.

A further purpose of the present invention is to provide a gearbox in a hybrid propulsion line, which gearbox can be controlled without the influence of a combustion engine.

By providing the gearbox with two epicyclic gears, a transmission is obtained according to the invention that changes gear without interruption in torque. The electrical machines that are connected to the epicyclic gears can either generate current or supply torque, or both generate current and supply torque, depending in the desired operating condition. The electrical machines can also provide each other with current in certain operating conditions. With the gearbox according to the invention, conventional clutches between the combustion engine and the gearbox can be avoided.

A first coupling unit that can be controlled is arranged to connect, in a manner that also allows them to be disengaged, two rotatable components at the first epicyclic gear, and a second coupling unit that can be controlled is arranged to connect, in a manner that allows them to be disengaged, two rotatable components at the second epicyclic gear.

At least one of the rate of revolution and the torque at the first and second main shafts can in this way be influenced by controlling at least one of the first and second coupling units to an engaged or a disengaged condition of the rotatable components.

A third coupling unit that can be controlled may be arranged to connect, in a manner that allows them to be disengaged, a rotatable component at the first epicyclic gear and a gear housing to each other. A fourth coupling unit that can be controlled may be arranged to connect, in a manner that allows them to be disengaged, a rotatable component at the second epicyclic gear and a gear housing to each other. At least one of the rate of revolution and the torque at the first and second main shaft can in this way be influenced by controlling at least one of the third and fourth coupling units to an engaged or a disengaged condition of the rotatable components.

According to one embodiment, first and second coupling units are arranged between the planet gear carrier and the sun gear of the first and second epicyclic gears, respectively. It is the task of the coupling units to lock the relevant planet gear carrier to the sun gear. When the planet gear carrier and the sun gear are connected to each other, the force from the combustion engine will pass through the planet gear carrier, the coupling unit, the sun gear and onwards to the gearbox, which results in the planet gears not absorbing any torque. This means that the dimensions of the planet gears can be adapted solely to the torque of the electrical machine instead of to the torque of the combustion engine, which in turn means that the planet gears can be designed with smaller dimensions. Thus, a drive arrangement according to the invention that has a compact design, low weight and low cost of manufacture is in this way obtained.

The coupling units preferably comprise a ring-shaped sheath that is axially displaced between an engaged and a disengaged condition. The sheath essentially concentrically surrounds the rotating components of the gearbox and it is displaced between the engaged and disengaged positions by means of a force element. A compact design with low weight and low cost of manufacture is in this way obtained.

According to one embodiment, a lock mechanism is arranged to connect in a fixed manner the output shaft of the combustion engine with the gearbox housing. In this way, also the first planet gear carrier will be locked fixed to the gearbox housing. By locking the output shaft of the combustion engine and the planet gear carrier to the gearbox housing by means of the lock mechanism, the gearbox, and thus also the vehicle, will become adapted for electrical operation by the electrical machines. Thus the electrical machines provide a torque to the output shaft of the gearbox.

The gearbox may be provided with a number of gear pairs that comprise cogged wheels that can be mechanically engaged and disengaged with a side shaft. In this way a number of fixed gear steps are obtained, between which it is possible to change gears without interruption in torque. The cogged wheels that can be engaged on the side shaft mean also that a compact design with high reliability and high dependability is obtained. Alternatively, cogged wheel drives can be arranged at the gear pairs, such that they can be engaged and disengaged at least one of the first and second main shafts.

Each one of the gear pairs has a gear exchange that is adapted to the desired driving performance of the vehicle. It is appropriate that the gear pair with the highest gear exchange, relative to the other gear pairs, is engaged when the lowest gear has been selected.

In order to disengage the sun gear and planet gear carrier at the relevant epicyclic gear, at least one of the first and second electrical machines is controlled such that torque balance is prevalent in the epicyclic gear. When torque balance has been achieved, the first or the second coupling unit is displaced such that the sun gear and the planet gear carrier are no longer mechanically connected to each other.

The term "torque balance" is here used to denote a condition in which a torque acts on a ring gear arranged at the epicyclic gear, corresponding to the product of the torque that acts on the planet gear carrier of the epicyclic gear and the gear exchange ratio of the planet gear, while at the same time a torque acts on the sun gear of the epicyclic gear, corresponding to the product of the torque that acts on the planet gear carrier and (1-the gear exchange ratio of the planet gear). In the case in which two of the component parts of the epicyclic gear, sun gear, ring gear and planet gear carrier, are connected by means of a coupling unit, this coupling unit transfers no torque between the components of the epicyclic gear when torque balance is prevalent. The coupling unit can in this way be displaced in a simple manner, and the components of the epicyclic gear disengaged.

BRIEF DESCRIPTION OF DRAWINGS

Preferred embodiments of the invention will be described as an example below with reference to attached drawings, of which.

DETAILED DESCRIPTION OF PREFERRED EMBODIMENTS OF THE INVENTION

Figure 1:
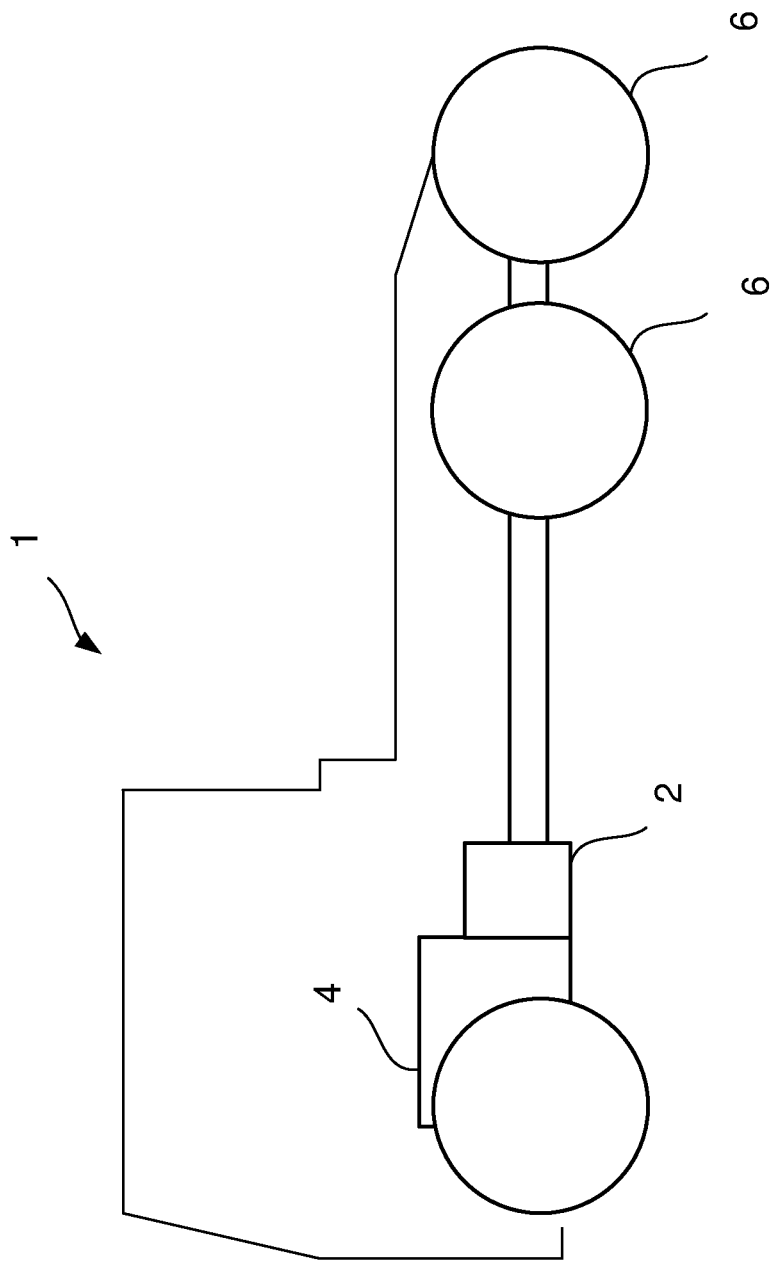
FIG. 1 shows schematically a vehicle in a side view with a gearbox according to the present invention.

FIG. 1 shows schematically a side view of a vehicle 1 that comprises a gearbox 2 according to the present invention. A combustion engine 4 is connected to the gearbox 2 and the gearbox 2 is further connected to the driving wheels 6 of the vehicle 1.

Figure 2:
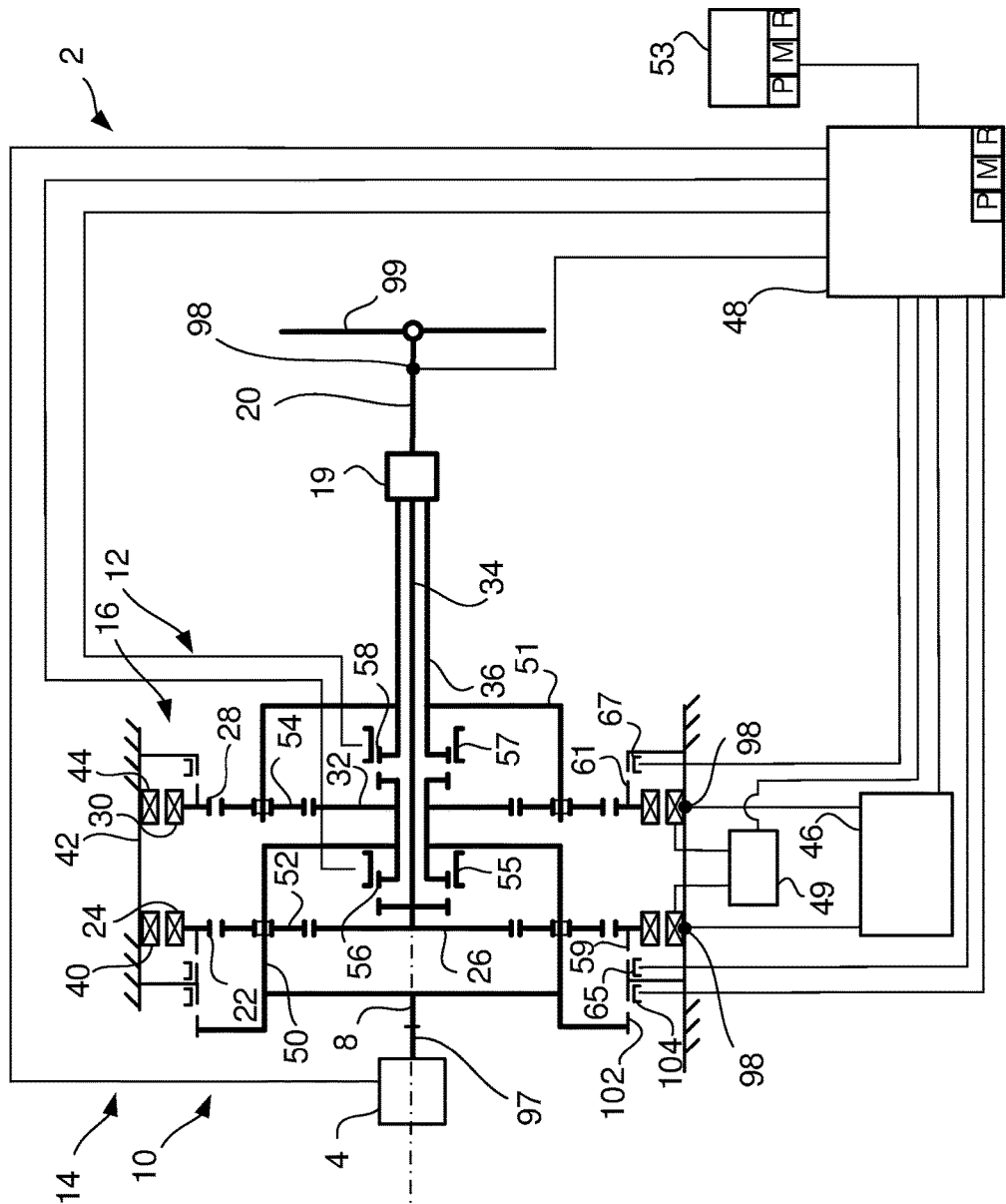
FIG. 2 shows a schematic side view of the gearbox according to the present invention.

FIG. 2 shows a schematic side view of the gearbox 2 according to the present invention. The gearbox 2 comprises an input shaft 8, first and second epicyclic gears 10 and 12, first and second electrical machines 14 and 16, and an output shaft 20. The first epicyclic gear 10 has a first ring gear 22, to which a first rotor 24 at the first electrical machine 14 is connected. The first epicyclic gear 10 has also a first sun gear 26. The second epicyclic gear 12 has a second ring gear 28, to which a second rotor 30 at the second electrical machine 16 is connected. The second epicyclic gear 12 has a second sun gear 32. The first and second sun gears 26 and 32 are arranged coaxially. According to the design that is shown in FIG. 2, a first main shaft 34 arranged at the first sun gear 26 to extend inside a second main shaft 36 arranged at the second sun gear 32, which second main shaft 36 is provided with a central bore 38. It is possible also to arrange the first main shaft 34 parallel to and at the side of the second main shaft 36. The first and second main shafts 34, 36 are connected to the output shaft through a transmission arrangement 19, that can demonstrate a freely chosen number of gear steps. This will be described in more detail below.

The first electrical machine 14 is provided with a first stator 40 that is connected to the vehicle 1, through a gear housing 42 that surrounds the gearbox 2. The second electrical machine 16 is provided with a second stator 44 that is connected to the vehicle 1, through the gear housing 42 that surrounds the gearbox 2. The first 14 and second electrical machine 16 is connected to an energy store 46, such as a battery, that drives the electrical machines 14 and 16 depending of the operating condition of the vehicle 1. In other operating conditions, the electrical machines 14 and 16 can function as generators, whereby current is supplied to the energy store 46. An electronic control unit 48 is connected to the energy store 46 and controls the supply of current to the electrical machines 14 and 16. It is preferable that the energy store 46 be connected to the electrical machines 14 and 16 through a switch 49 that is connected to the control unit 48. In certain operating conditions the electrical machines 14 and 16 can also drive each other. Electrical energy is then led from one electrical machine 14, 16 to the other electrical machine 14, 16 through the switch 49 that is connected to the electrical machines 14, 16. It is possible in this way to achieve a power balance between the electrical machines 14, 16. Another computer 53 may be connected to the control unit 48 and to the gearbox 2. By leading electrical energy from one of the electrical machines 14, 16 to the other electrical machine 14, 16 through the switch 49, electrical energy will not be led to and from the energy store 46. In this way, the conditions required for an increased lifetime of the energy store 46 are achieved. It is thus possible also to carry out gear changes and to propel the vehicle 1 without an energy store 46.

According to the design shown in FIG. 2, the first epicyclic gear 10 is provided with a first planet gear carrier 50, on which a first set of planet gears 52 is mounted in bearings. The second epicyclic gear 12 is provided with a second planet gear carrier 51, on which a second set of planet gears 54 is mounted in bearings. The first set of planet gears 52 interacts with the first ring gear 22 and with the first sun gear 26. The second set of planet gears 54 interacts with the second ring gear 28 and the second sun gear 32. The input shaft 8 of the gearbox 2 is connected to the first planet gear carrier 50. The first planet gear carrier 50 at the first epicyclic gear 10 is directly and fixed connected to the second sun gear 32 at the second epicyclic gear 12. The first planet gear carrier 50 and the second sun gear 32 in this way will always demonstrate the same direction of rotation and the same rate of revolution.

A first coupling unit 56 is arranged between the first sun gear 26 and the first planet gear carrier 50. By arranging the first coupling unit 56 such that the first sun gear 26 and the first planet gear carrier 50 are connected to each other and thus not able to rotate relative to each other, the first planet gear carrier 50 and the first sun gear 26 will rotate with equal rates of revolution.

A second coupling unit 58 is arranged between the second sun gear 32 and the second planet gear carrier 51. By arranging the second coupling unit 58 such that the second sun gear 32 and the second planet gear carrier 51 are connected to each other and thus not able to rotate relative to each other, the second planet gear carrier 51 and the second sun gear 32 will rotate with equal rates of revolution.

It is preferable that the first and second coupling units 56, 58 comprise first and second coupling sheaths 55 and 57 equipped with splines that can be displaced axially at a spline-equipped section with the first and second planet gear carrier 50 and 51 and at a spline-equipped section with the relevant sun gear 26 and 32. By displacing the relevant coupling sheath 55, 57 such that the spline-equipped sections are connected through the relevant coupling sheath 55, 57, the first planet gear carrier 50 and the first sun gear 26, and the second planet gear carrier 51 and the second sun gear 32, will become mutually locked to each other, and will not be able to rotate relative to each other. Thus, the first and second coupling units 56, 58 function as locks between the components 26, 50, 28, 51 that are components of the epicyclic gears.

The first and the second coupling units 56, 58 according to the design shown in FIG. 2 are arranged between the first sun gear 26 and the first planet gear carrier 50 and between the second sun gear 32 and the second planet gear carrier 51, respectively. It is, however, possible to arrange a further or an alternative coupling unit (not shown in the drawings) between the first ring gear 22 and the first planet gear carrier 50, and also to arrange a further or alternative coupling unit (not shown in the drawings) between the second ring gear 28 and the second planet gear carrier 51.

A third coupling unit 59 is arranged in this embodiment between the first ring gear 22 and the gear housing 42. By arranging the third coupling unit 59 such that the first ring gear 22 and the gear housing 42 are connected to each other and thus not able to rotate relative to each other, a gearing down of torque will take place, i.e. a gearing up of the rate of revolution from the planet gear carrier 50 to the first sun gear 26 will take place.

A fourth coupling unit 61 is arranged in this embodiment between the second ring gear 28 and the gear housing 42. By arranging the fourth coupling unit 61 such that the second ring gear 28 and the gear housing 42 are connected to each other and thus not able to rotate relative to each other, a gearing down of torque will take place, i.e. a gearing up of the rate of revolution from the planet gear carrier 50 to the second sun gear 32 will take place.

It is preferable that the third and fourth coupling units 59, 61 comprise a third and fourth coupling sheath 65 and 67 equipped with splines that can be displaced axially at a spline-equipped section with the first and second ring gears 22 and 28 and at a spline-equipped section with the gear housing 42. By displacing the relevant coupling sheath 65, 67 such that the spline-equipped sections are connected through the relevant coupling sheath 65, 67, the first ring gear 22 and the gear housing 42, and the second ring gear 28 and the gear housing 42, will become mutually locked to each other, and will not be able to rotate relative to each other. Thus, the third and fourth coupling units 59, 61 function as earthing arrangements between the components 22, 42, 28 specified above.

During operation, the gearbox 2 may work in certain operating conditions such that one of the sun gears 26 or 32 is locked against the first or second planet gear carrier 50 or 51 with the aid of the first or second coupling unit 56 or 58. The first or second main shaft 34 or 36 will then be given the same rate of revolution as the input shaft 8 of the gearbox 2, depending on which sun gear 22 or 28, that has been locked fixed at the relevant planet gear carrier 50 or 51. One or both of the electrical machines 14 and 16 may function as a generator in order to generate electrical energy to the energy store 46. Alternatively, the electrical machine 14 or 16 whose ring gear 22 or 28 is connected to the planet gear carrier 50 may provide an increase in torque in order in this way to increase the torque at the output shaft 20. The electrical machines 14 and 16 will, under certain operating conditions, provide each other with electrical energy, independently of the energy store 46.

Also the gearbox 2 may, in certain operating conditions, function such that one of the rotors 24 and 30 at the electrical machines 14 and 16 is locked fixed with the gear housing 42 through the ring gears 22 and 28, while the second electrical machine 14 and 16 functions as a generator in order to generate electrical energy to the energy store 46, which will be explained in more detail below. The electrical machine 14 or 16 whose rotor 24 or 30 is locked fixed with the gear housing 42 absorbs a reactive torque from the ring gear 22 or 28, before the locking is carried out with the aid of the third or fourth coupling unit 59 or 61. Instead of functioning as a generator, the electrical machine 14 or 16 may provide an increase in torque in order in this way to increase the torque at the output shaft 20.

It is possible also that both the first and second electrical machines 14 and 16 generate current to the energy store 46 at the same time. The driver releases the accelerator pedal (not shown in the drawings) of the vehicle 1 during engine braking. The output shaft 20 of the gearbox 2 then drives either one or both of the electrical machines 14 and 16, while the combustion engine 4 and the electrical machines 14 and 16 engine provide at the same time engine braking. The electrical machines 14 and 16 generate in this case electrical energy that is stored in the energy store 46 in the vehicle 1. This operating condition is known as "regenerative braking". In order to make a more powerful braking effect possible, the output shaft 97 of the combustion engine 4 may be fixed locked and in this way prevented from rotating. Thus, only one or both of the electrical machines 14 and 16 will function as a brake and generate electrical energy, which is stored in the energy store 46. The locking of the output shaft 97 of the combustion engine 4 may be carried out also when the vehicle is to be accelerated by only one or both of the electrical machines 14 and 16. If the total reactive torque of one or both of the electrical machines 14 and 16 through the epicyclic gears 10, 12 exceeds the torque of the combustion engine 4, the combustion engine 4 will not be able to withstand the large torque that the electrical machines 14 and 16 produce, for which reason it will be necessary to lock fixed the output shaft 97 of the combustion engine 4. The locking of the output shaft 97 of the combustion engine 4 is preferably carried out with a lock arrangement 102 that is arranged between the first planet gear carrier 50 and the gear housing 42. By locking the first planet gear carrier 50 and the gear housing 42, also the output shaft 97 of the combustion engine 4 will be locked, since the output shaft 97 of the combustion engine 4 is connected to the first planet gear carrier 50 through the input shaft 8 of the gearbox. It is preferable that the lock arrangement 102 comprise an eighth coupling sheath 104 equipped with splines that can be displaced axially at a spline-equipped section with the first planet gear carrier 50 and at a spline-equipped section with the gear housing. By displacing the eighth coupling sheath 104 such that the sections that are equipped with splines are connected through the coupling sheath 104, the first planet gear carrier 50 and thus also the output shaft 97 of the combustion engine 4 will be prevented from rotating.

The control unit 48 is connected to the electrical machines 14 and 16 and is adapted to control the electrical machines 14 and 16 such that under certain suitable operating conditions they use stored electrical energy in order to provide driving force to the output shaft 20 of the gearbox 2, and such that under other operating conditions they use the kinetic energy of the output shaft 20 of the gearbox 2 in order to produce and store electrical energy. The control unit 48 thus detects at least one of the rate of revolution and the torque at the output shaft 97 of the combustion engine 4 through sensors 98 arranged at the electrical machines 14 and 16 and at the output shaft 20 of the gearbox 2 in order in this way to collect information and to control the electrical machines 14 and 16 such that they function as electric motors or generators. The control unit 48 may be a computer with appropriate software for this purpose. The control unit 48 controls also the flow of electrical energy between the energy store 46 and the relevant stator 40 and 44 at the electrical machines 14 and 16. In conditions in which the electrical machines 14 and 16 function as motors, stored electrical energy is supplied from the energy store 46 to the relevant stator 40 and 44. In conditions in which the electrical machines 14 and 16 function as generators, electrical energy is supplied from the relevant stator 40 and 44 to the energy store 46. The electrical machines 14 and 16 can, however, as has been mentioned above, provide each other with electrical energy under certain operating conditions, independently of the energy store 46.

The first, second, third and fourth coupling units 56, 58, 59 and 61, are connected to the control unit 48 through their coupling sheaths. It is preferable that these components are activated and deactivated by electrical signals from the control unit 48. It is preferable that the coupling sheaths are displaced by force providers, not shown in the drawings, such as hydraulically or pneumatically powered cylinders. It is possible to displace the coupling sheaths also by electrically powered force providers.

Figure 3:
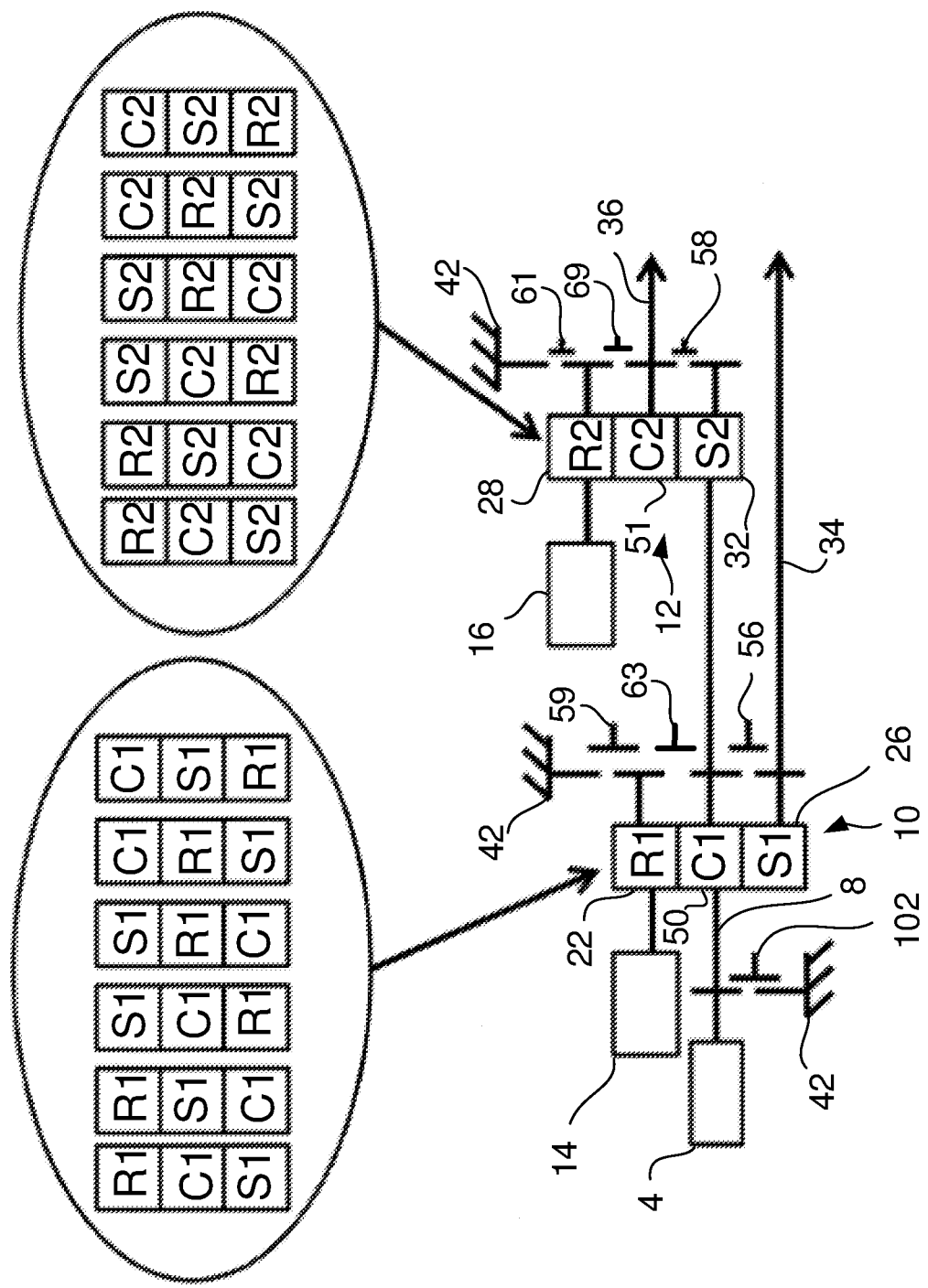
FIG. 3 shows a sketch in principle of the gearbox according to various designs.

FIG. 3 shows a sketch in principle of the gearbox according to various designs. The first epicyclic gear 10 comprises the three components: a first ring gear 22, a first sun gear 26 and a first planet gear carrier 50. According to FIG. 3, the various components are also specified as R1, C1 and S1 where R1 corresponds to the first ring gear 22, C1 the first planet gear carrier 50, and S1 the first sun gear 26. In a corresponding manner, the second epicyclic gear 12 comprises the three components: a second ring gear 28, a second sun gear 32 and a second planet gear carrier 51. According to FIG. 3, the various components at the second epicyclic gear 12 are also specified as R2, C2 and S2 where R2 corresponds to the second ring gear 28, C2 the second planet gear carrier 51, and S2 the second sun gear 32. In this way, the fundamental design of the gearbox 2 in FIG. 3 corresponds to what is shown in FIG. 2 above.

According to the fundamental design shown in FIG. 3, the first main shaft 34 is arranged at the first sun gear 26 and the second main shaft 36 is arranged at the second planet gear carrier 51. The first ring gear 22 is connected to the first electrical machine 14 and the second ring gear 28 is connected to the second electrical machine 16. The combustion engine 4 is connected to the first planet gear carrier 50 through the input shaft 8. The first coupling unit 56 is arranged between the first sun gear 26 and the first planet gear carrier 50. The second coupling unit 58 is arranged between the second sun gear 32 and the second planet gear carrier 51. The third coupling unit 59 is arranged between the first ring gear 22 and the gear housing 42, and the fourth coupling unit 61 is arranged between the second ring gear 28 and the gear housing 42. A lock arrangement 102 is arranged between the first planet gear carrier 50 and the gear housing 42. According to the fundamental design of the gearbox shown in FIG. 3, the first planet gear carrier 50 is connected to the second sun gear 32.

There are, however, as is made clear by FIG. 3, several different combinations of how the components at the first and second epicyclic gears 10, 12 can be combined in order to be connected to the combustion engine 4, the first and second electrical machines 14, 16, and the first and second main shafts 34, 36. As is made clear by FIG. 3, six different combinations of how the ring gears R1, R2, the planet gear carriers C1, C2 and the sun gears S1, S2 can be arranged at the first and second epicyclic gears 10, 12 are specified. Certain combinations, however, cannot be implemented in practice.

One combination that can be implemented in practice, in addition to the combination of the fundamental design, is R1, S1, C1 at the first epicyclic gear 10 and R2, S2, C2 at the second epicyclic gear 12. In this way, the first ring gear R1 at the first epicyclic gear 10 would be connected to the first electrical machine, the first sun gear S1 would be connected to the combustion engine 4, and the first planet gear carrier C1 would be connected to the first main shaft 34. At the second epicyclic gear 12, the second ring gear R2 would be connected to the second electrical machine, the second sun gear S2 would be connected to the second main shaft 36, and the second planet gear carrier C2 would be connected to the first sun gear S1.

Another combination that can be implemented in practice is R1, S1, C1 at the first epicyclic gear 10 and R2, C2, S2 at the second epicyclic gear 12. In this way, the first ring gear R1 at the first epicyclic gear 10 would be connected to the first electrical machine, the first sun gear S1 would be connected to the combustion engine 4, and the first planet gear carrier C1 would be connected to the first main shaft 34. At the second epicyclic gear 12, the second ring gear R2 would be connected to the second electrical machine, the second planet gear carrier C2 would be connected to the second main shaft 36, and the second sun gear S2 would be connected to the first sun gear S1.

For the various combinations above, it may be advantageous to arrange a further or an alternative coupling unit 63 between the first ring gear 22 and the first planet gear carrier 50, and also to arrange a further or alternative coupling unit 69 between the second ring gear 28 and the second planet gear carrier 51.

Figure 4:
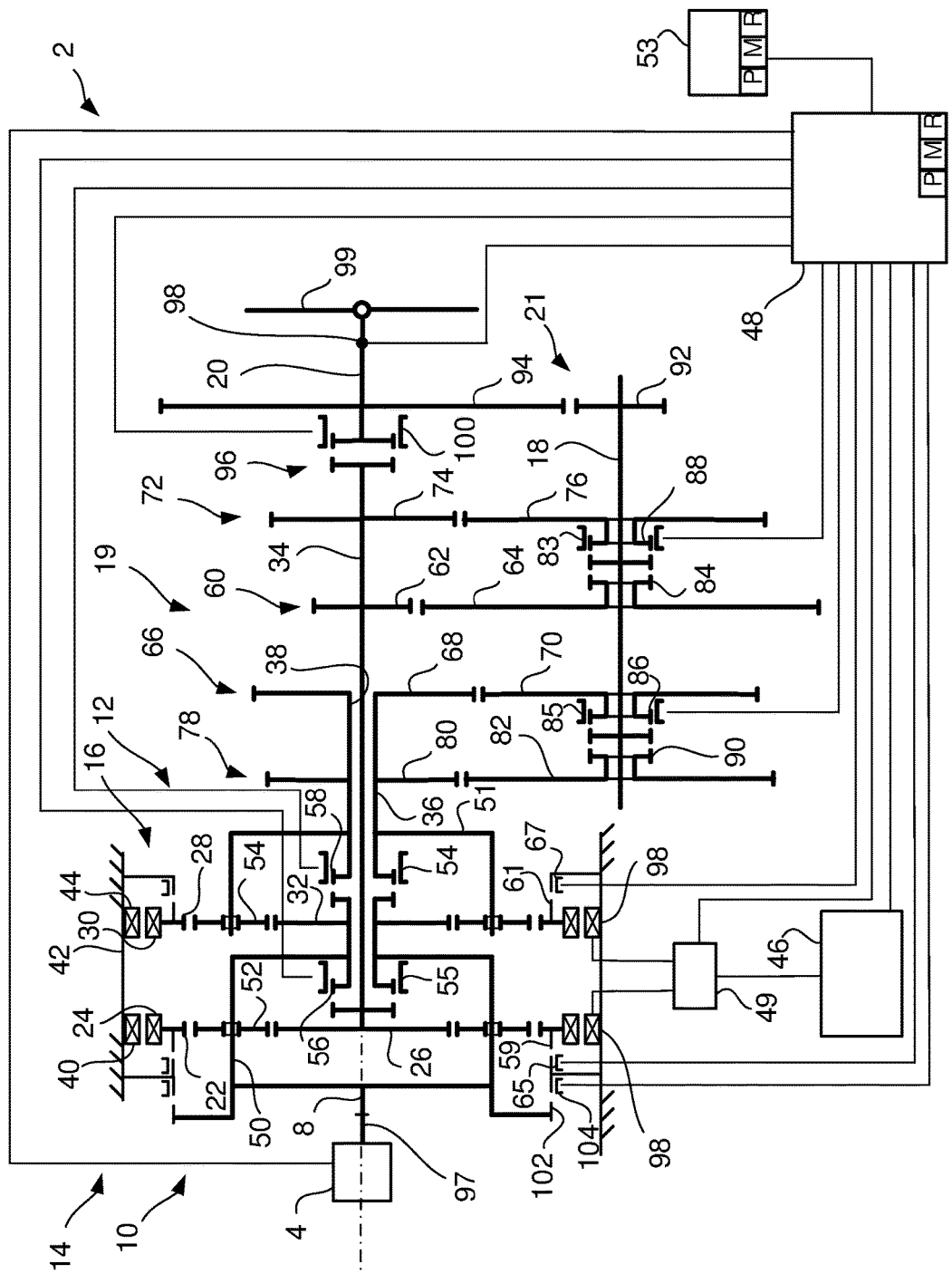
FIG. 4 shows a schematic side view of the gearbox according to one embodiment.

FIG. 4 shows a schematic side view of the gearbox 2 according to one embodiment. A transmission arrangement 19 comprises a first gear pair 60, which is arranged between the first epicyclic gear 10 and the output shaft 20. The first gear pair 60 comprises a first cogged wheel drive 62 and a first cogged wheel 64, which interact with each other. A second gear pair 66 is arranged between the second epicyclic gear 12 and the output shaft 20. The second gear pair 66 comprises a second cogged wheel drive 68 and a second cogged wheel 70, which interact with each other. A third gear pair 72 is arranged between the second epicyclic gear 12 and the output shaft 20. The third gear pair 72 comprises a third cogged wheel drive 74 and a third cogged wheel 76, which interact with each other. A fourth gear pair 78 is arranged between the second epicyclic gear 12 and the output shaft 20. The fourth gear pair 78 comprises a fourth cogged wheel drive 80 and a fourth cogged wheel 82, which interact with each other.

The first and third cogged wheel drives 62 and 74 are arranged at the first main shaft 34. The first and third cogged wheel drives 62 and 74 are fixed connected to the first main shaft 34, such that they cannot rotate relative to the first main shaft 34. The second and fourth cogged wheel drives 68 and 80 are arranged at the second main shaft 36. The second and fourth cogged wheel drives 68 and 80 are fixed connected to the second main shaft 36, such that they cannot rotate relative to the second main shaft 36.

A side shaft 18 extends essentially parallel to the first and second main shafts 34 and 36. The first, second, third and fourth cogged wheels 64, 70, 76 and 82 are arranged in bearings at the side shaft 18. The first cogged wheel drive 62 interacts with the first cogged wheel 64, the second cogged wheel drive 68 interacts with the second cogged wheel 70, the third cogged wheel drive 74 interacts with the third cogged wheel 76 and the fourth cogged wheel drive 80 interacts with the fourth cogged wheel 82.

The first, second, third and fourth cogged wheels 64, 70, 76 and 82 can be individually locked engaged and disengaged at the side shaft 18 with the aid of first, second, third and fourth coupling elements 84, 86, 88 and 90. The coupling elements 84, 86, 88 and 90 are preferably constituted by sections equipped with splines designed at the cogged wheels 64, 70, 76 and 82 and the side shaft 18 that interact with the fifth and sixth coupling sheaths 83, 85, which interact mechanically with the sections equipped with splines at the first to fourth cogged wheels 64, 70, 76 and 82, respectively, and the side shaft 18. It is preferable that the first and third coupling elements 84, 88 are provided with a common coupling sheath 83, and it is preferable that the second and fourth coupling elements 86, 90 are provided with a common coupling sheath 85. When in the disengaged condition, a relative rotation can arise between the cogged wheels 64, 70, 76 and 82 and the side shaft 18. The coupling elements 84, 86, 88 and 90 may be constituted also by friction couplings. Also a fifth cogged wheel 92 is arranged at the side shaft 18 that interacts with a sixth cogged wheel 94, which is arranged at the output shaft 20 of the gearbox 2.

The fifth and sixth cogged wheels 92 and 94 will function as a fifth gear pair 21 that transfers torque to the output shaft 20 of the gearbox 2.

The transfer of torque from the input shaft 8 of the gearbox 2 to the output shaft 20 of the gearbox 2 can take place through the first or the second epicyclic gears 10 or 12 and the side shaft 18. The transfer of torque may take place also directly through the first epicyclic gear 10, the first sun gear 26 of which is connected through the first main shaft 34 to the output shaft 20 of the gearbox 2 through a coupling mechanism 96 when any one of at least the three highest gears of the gearbox 2 has been connected. It is preferable that the coupling mechanism 96 comprise a seventh coupling sheath 100 equipped with splines, which coupling sheath can be axially displaced at the first main shaft 34 and the sections of the output axel 20 that are equipped with splines. By displacing the seventh coupling sheath 100 such that the sections that are equipped with splines are connected through the seventh coupling sheath 100, the first main shaft 34 will become fixed locked with the output shaft 20, and they will thus demonstrate on rotation the same rate of revolution.

According to the embodiments in FIGS. 2 and 4, four cogged wheel drives 62, 68, 74 and 80 and four cogged wheels 64, 70, 76 and 82 are shown, together with two epicyclic gears 10 and 12 with their associated electrical machines 14 and 16. It is, however, possible to design the gearbox 2 with a greater or lesser number of cogged wheel drives and cogged wheels and with a greater number of epicyclic gears with their associated electrical machines.

The first, second, third and fourth coupling elements 84, 86, 88 and 90, the coupling mechanism 96 between the first main shaft 34 and the output shaft 20, and the lock arrangement 102 between the first planet gear carrier 50 and the gear housing 42 are connected to the control unit 48 through the relevant coupling sheaths. It is preferable that these components are activated and deactivated by electrical signals from the control unit 48. It is preferable that the coupling sheaths are displaced by force providers, not shown in the drawings, such as hydraulically or pneumatically powered cylinders. It is possible to displace the coupling sheaths also by electrically powered force providers.

Figure 5:
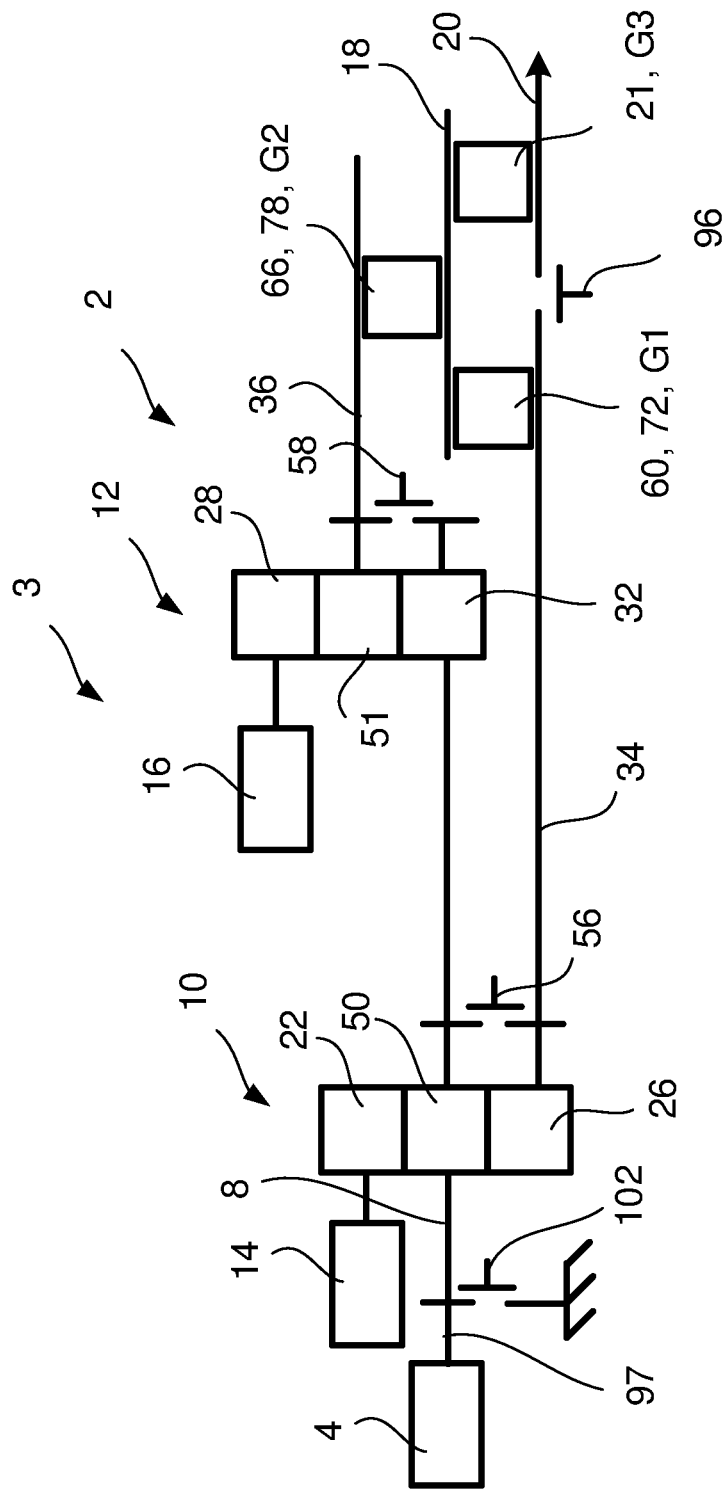
FIG. 5 shows a schematic view of the gearbox according to the present invention.

According to FIG. 5, there is illustrated the hybrid propulsion line 3 according to FIG. 2 in a simplified schematic view in which certain components have been omitted for reasons of clarity. FIG. 5 shows a gear pair G1 connected to the first main shaft 34 and thus also to the first epicyclic gear 10, and a gear pair G2 connected to the second main shaft 36 and thus also to the second epicyclic gear 12. These gear pairs G1, G2 are connected also to the output shaft 20 through the side shaft 18. The gear pair G1 that is connected to the first main shaft 34 may be constituted by, for example, the first gear pair 60 or the third gear pair 72 as described in FIGS. 2 and 4, and it may comprise also further gear pairs. The gear pair G2 that is connected to the second main shaft 36 may be constituted by, for example, the second gear pair 66 or the fourth gear pair 78 as described in FIGS. 2 and 4, and it may comprise also further gear pairs. Furthermore, the fifth gear pair G3, 21, which is connected to the output shaft 20 and the side shaft 18, and which is described also in FIGS. 2 and 4, is shown. G3 may, however, be constituted by further gear pairs. When changing gear, a suitable gear pair from the relevant group G1, G2, G3 is selected.

The, at least one, gear pair G1, 60, 72 that is connected to the first epicyclic gear 10 comprises at least one cogged wheel drive 62, 74 and cogged wheel 64, 76 arranged to interact with each other, which cogged wheel drive 62, 74 may be arranged such that it can be engaged and disengaged at the first main shaft 34 arranged with the first epicyclic gear 10. The, at least one, cogged wheel 64, 76 may be arranged such that it can be engaged and disengaged at the side shaft 18.

The, at least one, gear pair G2, 66, 78 that is connected to the second epicyclic gear 12 comprises at least one cogged wheel drive 68, 80 and cogged wheel 70, 82 arranged to interact with each other, which cogged wheel drive 68, 80 may be arranged such that it can be engaged and disengaged at the second main shaft 36 arranged with the second epicyclic gear 12. The, at least one, cogged wheel 70, 82 may be arranged such that it can be engaged and disengaged at the side shaft 18.

Gearing up from the first to the highest gear when the gearbox 2 is arranged in a vehicle 1 will be described below. The input shaft 8 of the gearbox 2 is connected to the output shaft 97 of the combustion engine 4 of the vehicle 1. The output shaft 20 of the gearbox 2 is connected to a drive shaft 99 at the vehicle 1. During idling of the combustion engine 4 and when the vehicle 1 is stationary, the input shaft 8 of the gearbox 2 rotates while the output shaft 20 of the gearbox 2 is at the same time stationary. The lock arrangement 102 is deactivated such that the output shaft 97 of the combustion engine 4 can rotate freely. Since the input shaft 8 of the gearbox 2 rotates, also the first planet gear carrier 50 will rotate, which leads to the first set of planet gears 52 rotating. Since the first planet gear carrier 50 is connected to the second sun gear 32, the second sun gear 32 and thus also the second set of planet gears 54 will rotate. By not supplying current and not withdrawing current from the first and second electrical machines 14 and 16, the first and second ring gears 22 and 28, which are connected to the first and second rotors 24 and 30, respectively, at the relevant electrical machine 14 and 16, will rotate freely, whereby no torque is absorbed by the ring gears 22 and 28. The first, second, third and fourth coupling units 56, 58, 59 and 61 are disengaged and thus are not engaged. Thus, no torque will be transferred from the combustion engine 4 to the sun gears 26 and 32 of the epicyclic gears 10 and 12. The coupling mechanism 96 between the first main shaft 34 and the output shaft 20 is disengaged, such that the first main shaft 34 and the output shaft 20 can rotate freely relative to each other. Since the sun gears 26 and 32 and the output shaft 20 of the gearbox 2 are in this phase stationary, also the side shaft 18 is stationary. During a first step, the first cogged wheel 64 and the second cogged wheel 70 are connected to the side shaft 18 with the aid of the first and second coupling elements 84 and 86. The third cogged wheel 76 and the fourth cogged wheel 82 are disengaged at the side shaft 18. In this way, the third cogged wheel 76 and the fourth cogged wheel 82 are allowed to rotate freely relative to the side shaft 18.

In order to start rotation of the output shaft 20 of the gearbox 2 with the purpose of driving the vehicle 1, the first cogged wheel drive 62 and the first cogged wheel 64 at the side shaft 18 are to be caused to rotate. This is achieved through the first sun gear 26 being caused to rotate. When the first sun gear 26 rotates, also the first main shaft 34 will rotate and thus also the first cogged wheel drive 62, which is arranged at the first main shaft 34, will rotate. The first sun gear 26 is caused to rotate through the first ring gear 22 being controlled with the first electrical machine 14. By activating the first electrical machine 14, the vehicle 1 will start to be displaced through the first main shaft 34 starting to rotate. When the first planet gear carrier 50 and the first sun gear 26 reach the same rate of revolution, the first sun gear 26 is locked with the first planet gear carrier 50 with the aid of the first coupling unit 56. As has been mentioned above, it is preferable that the first coupling unit 56 be so designed that the first sun gear 26 and the first planet gear carrier 50 interact mechanically with each other. Alternatively, the first coupling unit 56 may be designed as a glide brake or a lamellar clutch that connects in a gentle manner the first sun gear 26 and the first planet gear carrier 50. When the first sun gear 26 is connected to the first planet gear carrier 50, the first sun gear 26 will rotate at the same rate of revolution as the output shaft 97 of the combustion engine 4. In this way, the torque produced by the combustion engine 4 will be transferred to the output shaft 20 of the gearbox 2 through the first cogged wheel drive 62, the first cogged wheel 64 at the side shaft 18, the fifth cogged wheel 92 at the side shaft 18 and the sixth cogged wheel 94 at the output shaft 20 of the gearbox 2. Thus the vehicle 1 will start to be displaced and driven forwards by the first gear.

Each one of the first, second, third and fourth gear pairs 60, 66, 72, 78 has a gear exchange that is adapted to the desired driving performance of the vehicle 1. According to the embodiment shown in FIG. 2, the first gear pair 60 has the highest gear exchange compared with the second, third and fourth gear pairs 66, 72, 78, which leads to the first gear pair 60 being connected when the lowest gear has been selected. The third gear pair 72 transfers, just as the first gear pair 60 does, torque between the first main shaft 34 and the side shaft 18, and it would be possible instead to design this with the highest gear exchange compared with the other gear pairs 66, 72, 78, for which reason the third gear pair 72 in such a design would be connected when the lowest gear has been selected.

When the side shaft 18 is caused to rotate by the first cogged wheel 64 at the side shaft 18, also the second cogged wheel 70 at the side shaft 18 will rotate. In this way, the side shaft 18 drives the second cogged wheel 70, which in turn drives the second cogged wheel drive 68 at the second main shaft 36. When the second main shaft 36 rotates, also the second planet gear carrier 51 will rotate, which in this way, depending on the rate of revolution of the output shaft 97 of the combustion engine 4 and thus also the rate of revolution of the second planet gear carrier 51, will cause the second ring gear 28 and the second rotor 30 at the second electrical machine 16 to rotate. In this case, it is possible to allow the second electrical machine 16 to function as a generator in order to supply current to at least one of the energy store 46 and the first electrical machine 14. Alternatively, the second electrical machine 16 can provide additional torque through the control unit 48 controlling the second electrical machine 16 to provide propulsive torque.

In order to change gear from the first gear to the second gear, the lock between the first sun gear 26 and the first planet gear carrier 50 must be disengaged, which is achieved through at least one of the first and the second electrical machines 14, 16 being controlled such that torque balance is prevalent in the first epicyclic gear 10, after which the first coupling unit 56 is controlled such that it releases the first sun gear 22 and the first planet gear carrier 50 from each other. The second gear is engaged through the fourth coupling unit 61 being activated, such that the second ring gear 28 at the second epicyclic gear 12 is locked fixed with the gear housing 42. This can be achieved through the rate of revolution of the combustion engine 4 being controlled and the torque of the first and the second electrical machines 14, 16 being controlled in order to achieve a desired torque at the output shaft 20, such that the rotor 30 at the second electrical machine 16 is braked to stationary, after which the fourth coupling unit 61 is engaged, such that the second ring gear 28 and the gear housing 42 are mechanically connected to each other. Alternatively, the fourth coupling unit 61 may be designed as a glide brake or a lamellar clutch that connects in a gentle manner the second sun gear 28 and the gear housing 42. By synchronising the control of the combustion engine 4 and of the first and second electrical machines 14 and 16, it is possible to carry out a soft and interruption-free transition from the first gear to the second gear.

The second main shaft 36 is now rotating and is being driven by the output shaft 97 of the combustion engine 4, and the second main shaft 36 is now driving the second cogged wheel drive 68. The second planet gear carrier 51 is now driving the second cogged wheel drive 68 through the second main shaft 36. Since the second cogged wheel 70 is in interaction with the second cogged wheel drive 68 and is fixed connected to the side shaft 18, the second cogged wheel 70 will drive the side shaft 18, which in turn drives the fifth cogged wheel 92 at the side shaft 18. The fifth cogged wheel 92 in turn drives the output shaft 20 of the gearbox 2 through the sixth cogged wheel 94, which is arranged at the output shaft 20 of the gearbox 2. The vehicle 1 is now being propelled in second gear.

When the side shaft 18 is caused to rotate by the second cogged wheel 70, also the first cogged wheel 64 will rotate. The side shaft 18 in this way drives the first cogged wheel 64, which in turn drives the first cogged wheel drive 62 at the first main shaft 34. When the first main shaft 34 rotates, also the first sun gear 26 will rotate, which in this way, depending on the rate of revolution of the output shaft 97 of the combustion engine 4 and thus also the rate of revolution of the first planet gear carrier 50, will cause the first ring gear 22 and the first rotor 24 at the first electrical machine 14 to rotate. In this case, it is possible to allow the first electrical machine 14 to function as a generator in order to supply current to at least one of the energy store 46 and the second electrical machine 16. Alternatively, the first electrical machine 14 can provide additional torque through the control unit 48 controlling the first electrical machine 14 to provide propulsive torque.

In order to change gear from the second gear to the third gear, the first cogged wheel 64 at the side shaft 18 must be disengaged from the side shaft 18 with the first coupling element 84, such that the first cogged wheel 64 can rotate freely relative to the side shaft 18. The side shaft 18 is subsequently connected to the third cogged wheel 76 at the side shaft 18 through the third coupling element 88. In order to achieve connection of the side shaft 18 and the third cogged wheel 76 at the side shaft 18, preferably the first electrical machine 14 is controlled such that a synchronous rate of revolution arises between the side shaft 18 and the third cogged wheel 76 at the side shaft 18. A synchronous rate of revolution can be determined through the rate of revolution of the first rotor 24 at the first electrical machine 14 being measured and through the rate of revolution of the output shaft 20 being measured. In this way, the rate of revolution of the first main shaft 34 and the rate of revolution of the side shaft 18 can be determined through the given gear exchange ratio.

When a synchronous rate of revolution has arisen between the side shaft 18 and the third cogged wheel 76, the side shaft 18 and the third cogged wheel 76 are connected with the aid of the third coupling element 88. In order to change gear from the second gear to the third gear, the lock between the second ring gear 28 and the second planet gear carrier 51 must be disengaged, which is achieved through at least one of the first and the second electrical machines 14, 16 being controlled such that torque balance is prevalent in the second epicyclic gear 12, after which the fourth coupling unit 61 is controlled such that it releases the second ring gear 28 and the second planet gear carrier 51 from each other. The third gear is selected through the first coupling unit 56 being activated, such that the first sun gear 26 at the first epicyclic gear 10 is locked fixed to the first planet gear carrier 50. This can be achieved through the rate of revolution of the combustion engine 4 being controlled and the torque of the first and the second electrical machines 14, 16 being controlled in order to achieve a desired torque at the output shaft 20, such that a synchronous rate of revolution arises between the first sun gear 26 and the first planet gear carrier 50, after which the first coupling unit 56 is engaged, such that the first sun gear 26 and the first planet gear carrier 50 are connected to each other. By synchronising the control of the combustion engine 4 and of the first and second electrical machines 14 and 16, it is possible to carry out a soft and interruption-free transition from the second gear to the third gear.

The first main shaft 34 is now rotating with the same rate of revolution as the output shaft 97 of the combustion engine 4, and the first main shaft 34 is now driving the third cogged wheel drive 74 through the first main shaft 34. Since the third cogged wheel 76 interacts with the third cogged wheel drive 74 and is fixed connect to the side shaft 18, the third cogged wheel 76 will drive the side shaft 18, which in turn drives the fifth cogged wheel 92 at the side shaft 18. The fifth cogged wheel 92 in turn drives the output shaft 20 of the gearbox 2 through the sixth cogged wheel 94, which is arranged at the output shaft 20 of the gearbox 2. The vehicle 1 is now being propelled in third gear.

When the side shaft 18 is caused to rotate by the third cogged wheel 76 at the side shaft 18, also the second cogged wheel 70 at the side shaft 18 will rotate. In this way, the side shaft 18 drives the second cogged wheel 70, which in turn drives the second cogged wheel drive 68 at the second main shaft 36. When the second main shaft 36 rotates, also the second planet gear carrier 51 will rotate, which in this way, depending on the rate of revolution of the output shaft 97 of the combustion engine 4 and thus also the rate of revolution of the second planet gear carrier 51, will cause the second ring gear 28 and the second rotor 30 at the second electrical machine 16 to rotate. In this case, it is possible to allow the second electrical machine 16 to function as a generator in order to supply current to at least one of the energy store 46 and the first electrical machine 14. Alternatively, the second electrical machine 16 can provide additional torque through the control unit 48 controlling the second electrical machine 16 to provide propulsive torque.

In order to change gear from the third gear to the fourth gear, the second cogged wheel 70 must be disengaged from the side shaft 18 such that this can rotate freely relative to the side shaft 18. The side shaft 18 is subsequently connected to the fourth cogged wheel 82 with the aid of the fourth coupling element 90. In order to achieve connection of the side shaft 18 and the fourth cogged wheel 82, preferably the second electrical machine 16 is controlled such that a synchronous rate of revolution arises between the side shaft 18 and the fourth cogged wheel 82. A synchronous rate of revolution can be determined through the rate of revolution of the second rotor 30 at the second electrical machine 16 being measured and through the rate of revolution of the output shaft 20 being measured. In this way, the rate of revolution of the second main shaft 36 and the rate of revolution of the side shaft 18 can be determined through the given gear exchange ratio.

When a synchronous rate of revolution has arisen between the side shaft 18 and the fourth cogged wheel 82, the side shaft 18 and the fourth cogged wheel 82 are connected with the aid of the fourth coupling element 90. In order to change gear from the third gear to the fourth gear, the lock between the first sun gear 26 and the first planet gear carrier 50 must be disengaged, which is achieved through at least one of the first and the second electrical machines 14, 16 being controlled such that torque balance is prevalent in the first epicyclic gear 10, after which the first coupling unit 56 is controlled such that it releases the first sun gear 26 and the first planet gear carrier 50 from each other. The fourth gear is engaged through the fourth coupling unit 61 being activated, such that the second ring gear 28 at the second epicyclic gear 12 is locked fixed with the gear housing 42. This can be achieved through the rate of revolution of the combustion engine 4 being controlled and the torque of the first and the second electrical machines 14, 16 being controlled in order to achieve a desired torque at the output shaft 20, such that the second ring gear 28 becomes stationary relative to the gear housing 42, after which the fourth coupling unit 61 is engaged, such that the second ring gear 28 and the gear housing 42 are connected to each other. By synchronising the control of the combustion engine 4 and of the first and second electrical machines 14 and 16, it is possible to carry out a soft and interruption-free transition from the third gear to the fourth gear.

The second main shaft 36 is now being driven by the output shaft 97 of the combustion engine 4, and the second main shaft 36 is now driving the fourth cogged wheel drive 80. Since the fourth cogged wheel 82 interacts with the fourth cogged wheel drive 80 and is fixed connected to the side shaft 18, the fourth cogged wheel 82 will drive the side shaft 18, which in turn drives the fifth cogged wheel 92 at the side shaft 18. The fifth cogged wheel 92 in turn drives the output shaft 20 of the gearbox 2 through the sixth cogged wheel 94, which is arranged at the output shaft 20 of the gearbox 2. The vehicle 1 is now being propelled in fourth gear.

When the side shaft 18 is caused to rotate by the fourth cogged wheel 82, also the third cogged wheel 76 at the side shaft 18 will rotate. In this way, the side shaft 18 drives the third cogged wheel 76, which in turn drives the third cogged wheel drive 74 at the first main shaft 34. When the first main shaft 34 rotates, also the first sun gear 26 will rotate, which in this way, depending on the rate of revolution of the output shaft 97 of the combustion engine 4 and thus also the rate of revolution of the first planet gear carrier 50, will cause the first ring gear 22 and the first rotor 24 at the first electrical machine 14 to rotate. In this case, it is possible to allow the first electrical machine 14 to function as a generator in order to supply current to at least one of the energy store 46 and the second electrical machine 16. Alternatively, the first electrical machine 14 can provide additional torque through the control unit 48 controlling the first electrical machine 14 to provide propulsive torque.

In order to change gear from the fourth gear to the fifth gear, the third cogged wheel 76 must be disengaged from the side shaft 18 with the aid of the third coupling element 88, such that the third cogged wheel 76 can rotate freely relative to the side shaft 18. The side shaft 18 is subsequently connected to the first cogged wheel 64 through the first coupling element 84. In order to achieve connection of the side shaft 18 and the first cogged wheel 64, preferably the first electrical machine 14 is controlled such that a synchronous rate of revolution arises between the side shaft 18 and the first cogged wheel 64. A synchronous rate of revolution can be determined through the rate of revolution of the first rotor 24 at the first electrical machine 14 being measured and through the rate of revolution of the output shaft 20 being measured, as has been described above.

When a synchronous rate of revolution has arisen between the side shaft 18 and the first cogged wheel 64, the side shaft 18 and the first cogged wheel 64 are connected with the aid of the first coupling element 84. In order to change gear from the fourth gear to the fifth gear, the lock between the second ring gear 28 and the gear housing 42 must be disengaged, which is achieved through the second electrical machine 16 being controlled such that torque balance arises between the second ring gear 28 and the gear housing 42, after which the fourth coupling unit 61 is controlled such that it releases the second ring gear 28 and the gear housing 42 from each other. Torque balance comprises not only a torque-free condition, but also a counteracting torque such that the fourth coupling unit 61 is to be placed into a condition in which it does not transfer torque between the second ring gear 28 and the gear housing 42, after which the third coupling unit 59 is activated and mechanically locks the first ring gear 22 with the gear housing 42. Alternatively, the third coupling unit 59 may be designed as a glide brake or a lamellar clutch that connects in a gentle manner the first ring gear 22 and the gear housing 42. By synchronising the control of the combustion engine 4 and of the first and second electrical machines 14 and 16, it is possible to carry out a soft and interruption-free transition from the fourth to the fifth gear. When the first ring gear 22 has been braked and locked fixed, the first set of planet gears 52 will drive the first sun gear 26, such that the first sun gear 26 rotates. In this way, the torque produced by the combustion engine 4 will be transferred to the output shaft 20 of the gearbox 2 through the first cogged wheel drive 62, the first cogged wheel 64 at the side shaft 18, the fifth cogged wheel 92 at the side shaft 18 and the sixth cogged wheel 94 at the output shaft 20 of the gearbox 2. The vehicle 1 is now being propelled in fifth gear.

When the side shaft 18 is caused to rotate by the first cogged wheel 64 at the side shaft 18, also the fourth cogged wheel 82 at the side shaft 18 will rotate. In this way, the side shaft 18 drives the fourth cogged wheel 82, which in turn drives the fourth cogged wheel drive 80 at the second main shaft 36. When the second main shaft 36 rotates, also the second planet gear carrier 51 will rotate, which in this way, depending on the rate of revolution of the output shaft 97 of the combustion engine 4 and thus also the rate of revolution of the second planet gear carrier 51, will cause the second ring gear 28 and the second rotor 30 at the second electrical machine 16 to rotate. In this case, it is possible to allow the second electrical machine 16 to function as a generator in order to supply current to at least one of the energy store 46 and the first electrical machine 14. Alternatively, the second electrical machine 16 can provide additional torque through the control unit 48 controlling the second electrical machine 16 to provide propulsive torque.

In order to change gear from the fifth gear to the sixth gear, the fourth cogged wheel 82 must be disengaged from the side shaft 18 such that this can rotate freely relative to the side shaft 18. The side shaft 18 is subsequently connected to the second cogged wheel 70 with the aid of the second coupling element 86. In order to achieve connection of the side shaft 18 and the second cogged wheel 70, preferably the second electrical machine 16 is controlled such that a synchronous rate of revolution arises between the side shaft 18 and the second cogged wheel 70. A synchronous rate of revolution can be achieved as described above.

When a synchronous rate of revolution has arisen between the side shaft 18 and the second cogged wheel 70, the side shaft 18 and the second cogged wheel 70 are connected at the side shaft 18 with the aid of the second coupling element 86. In order to carry out change of gear from the fifth gear to the sixth gear, the locking between the first ring gear 22 and gear housing 42 must be disengaged, which is achieved through the first electrical machine 14 being controlled such that torque balance arises between the first ring gear 22 and the gear housing 42, after which the third coupling unit 59 is controlled such that it releases the first ring gear 22 and the gear housing 42 from each other. The sixth gear is selected through the second coupling unit 58 being activated, such that the second sun gear 32 at the second epicyclic gear 12 is locked to the second planet gear carrier 51. This can be achieved through the rate of revolution of the combustion engine 4 being controlled and the torque of the first and the second electrical machines 14, 16 being controlled in order to achieve a desired torque at the output shaft 20, such that a synchronous rate of revolution arises between the second sun gear 32 and the second planet gear carrier 51, after which the second coupling unit 58 is engaged, such that the second sun gear 32 and the second planet gear carrier 51 are mechanically connected to each other. Alternatively, the second coupling unit 58 may be designed as a glide brake or a lamellar clutch that connects in a gentle manner the second ring gear 28 and the gear housing 42. By synchronising the control of the combustion engine 4 and of the first and second electrical machines 14 and 16, it is possible to carry out a soft and interruption-free transition from the fifth gear to the sixth gear.

The second main shaft 36 is now driving the second cogged wheel drive 68. The second planet gear carrier 51 is now driving the second cogged wheel drive 68 through the second main shaft 36. Since the second cogged wheel 70 at the side shaft 18 is in interaction with the second cogged wheel drive 68 and is fixed connected to the side shaft 18, the second cogged wheel 70 will drive the side shaft 18, which in turn drives the fifth cogged wheel 92 at the side shaft 18. The fifth cogged wheel 92 in turn drives the output shaft 20 of the gearbox 2 through the sixth cogged wheel 94, which is arranged at the output shaft 20 of the gearbox 2.

The vehicle 1 is now being propelled in sixth gear. When the side shaft 18 is caused to rotate by the second cogged wheel 70, also the first cogged wheel 64 at the side shaft 18 will rotate. The side shaft 18 in this way drives the first cogged wheel 64, which in turn drives the first cogged wheel drive 62 at the first main shaft 34. When the first main shaft 34 rotates, also the first sun gear 26 will rotate, which in this way, depending on the rate of revolution of the output shaft 97 of the combustion engine 4 and thus also the rate of revolution of the first planet gear carrier 50, will cause the first ring gear 22 and the first rotor 24 at the first electrical machine 14 to rotate. In this case, it is possible to allow the first electrical machine 14 to function as a generator in order to supply current to at least one of the energy store 46 and the second electrical machine 16. Alternatively, the first electrical machine 14 can provide additional torque through the control unit 48 controlling the first electrical machine 14 to provide propulsive torque.

In order to change gear from the sixth gear to the seventh gear, the first cogged wheel 64 must be disengaged from the side shaft 18 with the first coupling element 84, such that the first cogged wheel 64 can rotate freely relative to the side shaft 18. The first main shaft 34 is subsequently connected to the output shaft 20 through the coupling mechanism 96. In order to achieve connection of the first main shaft 34 to the output shaft 20 through the coupling mechanism 96, preferably the first electrical machine 14 is controlled such that a synchronous rate of revolution arises between the first main shaft 34 and the output shaft 20. A synchronous rate of revolution can be achieved as described above.

When a synchronous rate of revolution has arisen between the first main shaft 34 and the output shaft 20, the first main shaft 34 is connected to the output shaft 20 through the coupling mechanism 96. Alternatively, the coupling mechanism 96 may be constituted by a slip clutch. In order to change gear from the sixth gear to the seventh gear, the lock between the second sun gear 32 and the second planet gear carrier 51 must be disengaged, which is achieved through at least one of the first and the second electrical machines 14, 16 being controlled such that torque balance is prevalent in the second epicyclic gear 12, after which the second coupling unit 58 is controlled such that it releases the second sun gear 32 and the second planet gear carrier 51 from each other. The seventh gear is selected through the first coupling unit 56 being activated, such that the first sun gear 26 at the first epicyclic gear 10 is locked fixed to the first planet gear carrier 50. This can be achieved through the rate of revolution of the combustion engine 4 being controlled and the torque of the first and the second electrical machines 14, 16 being controlled in order to achieve a desired torque at the output shaft 20, such that a synchronous rate of revolution arises between the first sun gear 26 and the first planet gear carrier 50, after which the first coupling unit 56 is engaged, such that the first sun gear 26 and the first planet gear carrier 50 are connected to each other. By synchronising the control of the combustion engine 4 and of the first and second electrical machines 14 and 16, it is possible to carry out a soft and interruption-free transition from the sixth gear to the seventh gear.

The first main shaft 34 is now driving the output shaft 20 through the coupling mechanism 96. The vehicle 1 is now being propelled in seventh gear.

The side shaft 18 is caused to rotate by the sixth cogged wheel 94 at the output shaft 20. This means that also the second cogged wheel 70 at the side shaft 18 will rotate. In this way, the side shaft 18 drives the second cogged wheel 70, which in turn drives the second cogged wheel drive 68 at the second main shaft 36. When the second main shaft 36 rotates, also the second planet gear carrier 51 will rotate, which in this way, depending on the rate of revolution of the output shaft 97 of the combustion engine 4 and thus also the rate of revolution of the second planet gear carrier 51, will cause the second ring gear 28 and the second rotor 30 at the second electrical machine 16 to rotate. In this case, it is possible to allow the second electrical machine 16 to function as a generator in order to supply current to at least one of the energy store 46 and the first electrical machine 14. Alternatively, the second electrical machine 16 can provide additional torque through the control unit 48 controlling the second electrical machine 16 to provide propulsive torque.

In order to change gear from the seventh gear to the eighth gear, the second cogged wheel 70 must be disengaged from the side shaft 18 such that this can rotate freely relative to the side shaft 18. The side shaft 18 is subsequently connected to the fourth cogged wheel 82 with the aid of the fourth coupling element 90. In order to achieve connection of the side shaft 18 and the fourth cogged wheel 82, preferably the second electrical machine 16 is controlled such that a synchronous rate of revolution arises between the side shaft 18 and the fourth cogged wheel 82. A synchronous rate of revolution can be achieved as described above.

When a synchronous rate of revolution has arisen between the side shaft 18 and the fourth cogged wheel 82, the side shaft 18 and the fourth cogged wheel 82 are connected with the aid of the fourth coupling element 90. In order to change gear from the seventh gear to the eighth gear, the lock between the first sun gear 26 and the first planet gear carrier 50 must be disengaged, which is achieved through at least one of the first and the second electrical machines 14, 16 being controlled such that torque balance is prevalent in the first epicyclic gear 10, after which the first coupling unit 56 is controlled such that it releases the first sun gear 26 and the first planet gear carrier 50 from each other. The eighth gear is selected through the second coupling unit 58 being activated, such that the second sun gear 32 at the second epicyclic gear 12 is locked to the second planet gear carrier 51. This can be achieved through the combustion engine 4 being controlled such that a synchronous rate of revolution arises between the second sun gear 32 and the second planet gear carrier 51, after which the second coupling unit 58 is engaged, such that the second sun gear 32 and the second planet gear carrier 51 are connected to each other. By synchronising the control of the combustion engine 4 and of the first and second electrical machines 14 and 16, it is possible to carry out a soft and interruption-free transition from the seventh gear to the eighth gear.

The second main shaft 36 is now driving the fourth cogged wheel drive 80. Since the fourth cogged wheel 82 interacts with the fourth cogged wheel drive 80 and is fixed connected to the side shaft 18, the fourth cogged wheel 82 will drive the side shaft 18, which in turn drives the fifth cogged wheel 92 at the side shaft 18. The fifth cogged wheel 92 in turn drives the output shaft 20 of the gearbox 2 through the sixth cogged wheel 94, which is arranged at the output shaft 20 of the gearbox 2. The vehicle 1 is now being propelled in eighth gear.

Since the coupling mechanism 96 has been applied, the output shaft will drive the first main shaft 34. When the first main shaft 34 rotates, also the first sun gear 26 will rotate, which in this way, depending on the rate of revolution of the output shaft 97 of the combustion engine 4 and thus also the rate of revolution of the first planet gear carrier 50, will cause the first ring gear 22 and the first rotor 24 at the first electrical machine 14 to rotate. In this case, it is possible to allow the first electrical machine 14 to function as a generator in order to supply current to at least one of the energy store 46 and the second electrical machine 16. Alternatively, the first electrical machine 14 can provide additional torque through the control unit 48 controlling the first electrical machine 14 to provide propulsive torque.

According to the design described above, it is stated that the gearbox 2 comprises cogged wheel drives 62, 68, 74, 80 and cogged wheels 64, 70, 76, 82 arranged at the main shafts 34, 36 and the side shaft 18 in order to transfer rates of revolution and torque. It is, however, possible to use another type of transmission, such as chain and belt transmissions in order to transfer rates of revolution and torque in the gearbox 2.

The transmission arrangement 19 demonstrates according to the embodiment above four gear pairs 60, 66, 72, 78. The transmission arrangement 19, however, may comprise a freely chosen number of gear pairs.

As has been described above, torque is withdrawn from the gearbox 2 from the output shaft 20. It is possible also to withdraw torque directly from the first or the second main shaft 34, 36, or directly from the side shaft 18. Torque may be withdrawn also in parallel from two or three of the shafts 18, 34, 36 at the same time.

Figure 6:
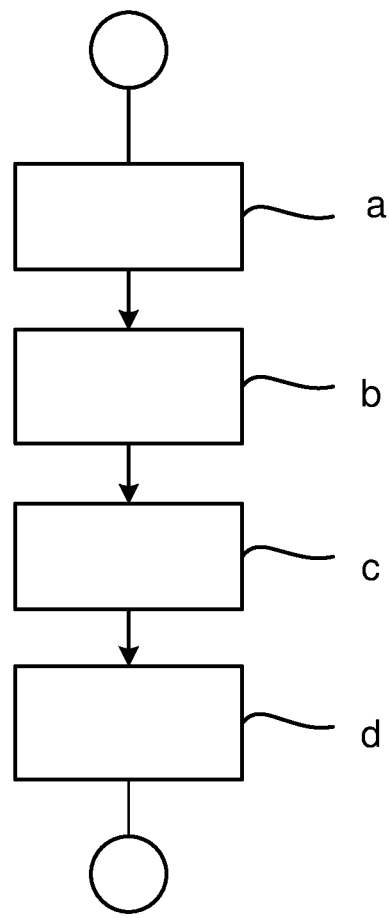
FIG. 6 shows a flow diagram concerning a method to control the gearbox according to the present invention.

FIG. 6 shows a flow diagram concerning a method to control the gearbox 2 according to the invention. The method according to the invention is characterised by the steps:

a) to control at least one of the first and the second electrical machines 14, 16 not only to achieve torque balance in the relevant epicyclic gear 10, 12, but also to achieve a synchronous rate of revolution between two rotatable components 22, 26, 50; 28, 32, 51 at the first or second epicyclic gear 10, 12; and b) to control a first or second coupling unit 56, 58 that can be controlled in order to connect the two rotatable components 22, 26, 50; 28, 32, 51 at the first or second epicyclic gear 10, 12 when a synchronous rate of revolution between the two rotatable components 22, 26, 50; 28, 32, 51 has been achieved and in order to disengage the two rotatable components 22, 26, 50; 28, 32, 51 at the first or second epicyclic gear 10, 12 when torque balance has been achieved in the relevant epicyclic gear 10, 12.

The method is further characterised by the additional steps:

c) to control the first or the second electrical machine 14, 16 in order to achieve a synchronous rate of revolution or such that torque balance is prevalent between one of the two rotatable components 22, 26, 50; 28, 32, 51 at the first or second epicyclic gear 10, 12 and a gear housing 42; and d) to control a third or fourth coupling unit 59, 61 that can be controlled in order to engage or disengage the rotatable component 22, 26, 50; 28, 32, 51 at the first or second epicyclic gear 10, 12 to the gear housing 42.

According to a further step of the method, a combustion engine 4 that is connected to the input shaft 8 is controlled such that at least one of the rate of revolution and the torque at the first and second main shafts 34, 36 is influenced.

According to a further step of the method, electrical energy is generated at steps a) and c) with one of the electrical machines 14, 16 in order to drive the other electrical machine 14, 16.

According to a further step of the method, the first and second electrical machines 14, 16, are controlled such that the torque at the first and second main shafts 34, 36 is constant or changes in a continuous manner.

Change of gear can in this way be achieved without interruption in torque through the torque at the output shaft 20 being constant or changing in a continuous manner, during, for example, acceleration or retardation of the vehicle 1.

The specified method thus comprises all steps of a change of gear corresponding to all gears described in the embodiment above.

According to the invention, a computer program P that may comprise routines for the control of the gearbox 2 according to the present invention is provided.

The computer program P may comprise routines to control the first or the second electrical machine 14, 16 in order to achieve a synchronous rate of revolution or such that torque balance is prevalent between one of the two rotatable components 22, 26, 50; 28, 32, 51 at the first or second epicyclic gear 10, 12.

The computer program P may comprise routines to control a first or second coupling unit 56, 58 that can be controlled in order to engage or disengage the two rotatable components 22, 26, 50; 28, 32, 51 at the first or second epicyclic gear 10, 12.

The computer program P may comprise routines to control the first or the second electrical machine 14, 16 in order to achieve a synchronous rate of revolution or such that torque balance is prevalent between one of the two rotatable components 22, 26, 50; 28, 32, 51 at the first or second epicyclic gear 10, 12 and a gear housing 42. The computer program P may comprise routines to control a third or fourth coupling unit 59, 61 that can be controlled in order to engage or disengage the rotatable component 22, 26, 50; 28, 32, 51 at the first or second epicyclic gear 10, 12 to the gear housing 42.

The computer program P may comprise routines to control a combustion engine 4 that is connected to the input shaft 8 such that at least one of the rate of revolution and the torque at the first and second main shafts 34, 36 is influenced.

The computer program P may comprise routines to generate electrical energy at the steps a) and c) with one of the electrical machines 14, 16 in order to drive the other electrical machine 14, 16.

The computer program P may comprise routines to control the first and second electrical machines 14, 16 such that the torque at the first and second main shafts 34, 36 is constant or changes in a continuous manner.

The computer program P may be stored in an executable form or in a compressed form in at least one of a memory M and a read/write memory R. The said program code may be stored in permanent form on the said medium that can be read by a computer 53.

The invention concerns also a computer program product comprising a program code stored on a medium that can be read by a computer, in order to carry out the method steps described above, when the said computer program is run on the control unit 48 or another computer 53 connected to the control unit 48.

The specified components and distinctive features that are specified above may be combined between the different specified executions within the framework of the invention.

The invention claimed is:

1. A gearbox comprising:
   an input shaft;
   an output shaft;
   a first epicyclic gear connected to the input shaft, the first epicyclic gear including at least three first rotatable components, the first rotatable components including a first ring gear, a first sun gear, and a first planet gear carrier;
   a second epicyclic gear connected to the first epicyclic gear, the second epicyclic gear including at least three second rotatable components, the second rotatable components including a second ring gear, a second sun gear, and a second planet gear carrier;
   a first electrical machine directly connected to one of the first rotatable components of the first epicyclic gear;
   a second electrical machine directly connected to one of the second rotatable components of the second epicyclic gear;
   a first main shaft arranged at and connected to the first epicyclic gear;
   a second main shaft arranged at and connected to the second planet gear carrier of the second epicyclic gear;
   a first controlling coupling unit configured to connect two first rotatable components of the first epicyclic gear in a manner that allows the connected two first rotatable components to be disengaged; and
   a second controlling coupling unit configured to connect two second rotatable components of the second epicyclic gear in a manner that allows the connected two second rotatable components to be disengaged;
   wherein the input shaft is connected to the first planet gear carrier at the first epicyclic gear;
   whereby at least one of a rate of revolution and a torque at the first and the second main shafts may be controlled by engagement or disengagement of the first two rotatable components or the second two rotatable components with the first or the second coupling units.

2. The gearbox according to claim 1, further comprising:
   a third controlling coupling unit configured to connect disengageably a first rotatable component at the first epicyclic gear and a gear housing; and
   a fourth controlling coupling unit configured to connect to each other, in a manner that allows them to be disengaged, a second rotatable component at the second epicyclic gear and the gear housing;
   whereby at least one of the rate of revolution and the torque at the first and second main shafts may be controlled by engagement or disengagement of the first or the second rotatable components with the third or the fourth coupling units.

3. The gearbox according to claim 2, further comprising:
   the third coupling unit is configured to connect to each other, in a manner that allows them to be disengaged, the first ring gear arranged at the first epicyclic gear and the gear housing; and
   the fourth coupling unit is configured to connect to each other, in a manner that allows them to be disengaged, the second ring gear at the second epicyclic gear and the gear housing.

4. The gearbox according to claim 3, wherein a first rotor of the first electrical machine is connected to the first ring gear; and
   a second rotor of the second electrical machine is connected to the second ring gear.

5. The gearbox according to claim 1, wherein:
   the first planet gear carrier at the first epicyclic gear is connected to the second sun gear at the second epicyclic gear; and
   the first sun gear at the first epicyclic gear is connected to the first main shaft.

6. The gearbox according to claim 5, wherein:
   the first coupling unit is configured to connect the first sun gear to the first planet gear carrier in a manner that allows the first sun gear and the first planet gear carrier to be disengaged; and
   the second coupling unit is configured to connect a second sun gear with the second planet gear carrier in a manner that allows the second sun gear and the second planet wheel carrier to be disengaged.

7. The gearbox according to claim 1, further comprising a coupling mechanism between the first main shaft and the output shaft.

8. The gearbox according to claim 1, further comprising:
   a first gear pair between the first epicyclic gear and the output shaft; and
   a second gear pair between the second epicyclic gear and the output shaft.

9. The gearbox according to claim 8, wherein:
   the first gear pair comprises a first cogged wheel drive and a first cogged wheel that interact with each other, wherein the first cogged wheel drive is fixed with the first main shaft and wherein the first cogged wheel is arranged at a side shaft such that it can be engaged and disengaged;
   the second gear pair comprises a second cogged wheel drive and a second cogged wheel that interact with each other, wherein the second cogged wheel drive is fixed with the second main shaft and the second cogged wheel is arranged at the side shaft such that it can be engaged and disengaged; and
   the side shaft is connected to the output shaft.

10. The gearbox according to claim 9, further comprising:
    a third gear pair between the first epicyclic gear and the output shaft, the third gear pair comprises a third cogged wheel drive and a third cogged wheel that interact with each other, wherein the third cogged wheel drive is fixed with the first main shaft and the third cogged wheel is arranged at the side shaft such that the side shaft can be engaged and disengaged; and
    a fourth gear pair between the second epicyclic gear and the output shaft; and
    the fourth gear pair comprises a fourth cogged wheel drive and a fourth cogged wheel that interact with each other, the fourth cogged wheel drive is fixed with the second main shaft and wherein the fourth cogged wheel is arranged at the side shaft such that the side shaft can be engaged and disengaged.

11. The gearbox according to claim 10, wherein the first, the second, the third, and the fourth cogged wheels are arranged at the side shaft to be engaged with and disengaged from the first, the second, the third, and the fourth coupling elements such that they can be engaged and disengaged.

12. The gearbox according to claim 9, further comprising a final gear connecting the side shaft to the output shaft.

13. The gearbox according to claim 12, further comprising the final gear comprises a fifth cogged wheel arranged at the side shaft, and a sixth cogged wheel fixed at the output shaft; and the fifth and sixth cogged wheels interact with each other.

14. A vehicle, comprising a gearbox according to claim 1.

* * * * *